(12) United States Patent
Schwarzer et al.

(10) Patent No.: US 11,697,155 B2
(45) Date of Patent: Jul. 11, 2023

(54) METAL PASTE AND USE THEREOF FOR JOINING COMPONENTS

(71) Applicant: Heraeus Deutschland GmbH & Co. KG, Hanau (DE)

(72) Inventors: Christian Schwarzer, Hanau (DE); Wolfgang Schmitt, Rodgau (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 366 days.

(21) Appl. No.: 17/047,356

(22) PCT Filed: Jul. 19, 2019

(86) PCT No.: PCT/EP2019/069483
§ 371 (c)(1),
(2) Date: Oct. 13, 2020

(87) PCT Pub. No.: WO2020/057806
PCT Pub. Date: Mar. 26, 2020

(65) Prior Publication Data
US 2021/0114102 A1    Apr. 22, 2021

(30) Foreign Application Priority Data
Sep. 20, 2018 (EP) .................................. 18195619

(51) Int. Cl.
B22F 7/06 (2006.01)
(52) U.S. Cl.
CPC .................... B22F 7/064 (2013.01)

(58) Field of Classification Search
CPC .............................. B22F 7/064; C09D 5/00
See application file for complete search history.

(56) References Cited

U.S. PATENT DOCUMENTS

| 2014/0203222 A1* | 7/2014 | Ito ........................ H05K 1/095 252/512 |
| 2018/0147673 A1* | 5/2018 | Schmitt ................ B22F 1/0003 |
| 2019/0019911 A1* | 1/2019 | Hardin ................ H01L 31/0512 |

FOREIGN PATENT DOCUMENTS

| CN | 103190018 A | 7/2013 | |
| EP | 3009211 A1 * | 4/2016 | ............ B22F 1/0003 |
| JP | 2001335720 A | 12/2001 | |
| JP | 2005133119 A | 5/2005 | |
| TW | 201616624 A | 5/2016 | |
| WO | WO-2015162405 A1 | 10/2015 | |

OTHER PUBLICATIONS

International Search Report issued in PCT/EP2019/069483 dated Sep. 27, 2019.

* cited by examiner

*Primary Examiner* — Rebecca Janssen
(74) *Attorney, Agent, or Firm* — Blank Rome LLP

(57) ABSTRACT

A metal paste, comprising (A) 65 to 85 wt % of metal particles and (B) 10 to 35 wt % of organic solvent, wherein the metal particles (A) consist 70 to 100 wt % of organically coated copper flakes having a specific surface area in the range of 1.9 to 3.7 m$^2$/g, a total oxygen content in the range of 2 to 4 wt % and a weight ratio of total carbon to total oxygen in the range of 0.25 to 0.9.

20 Claims, No Drawings

METAL PASTE AND USE THEREOF FOR JOINING COMPONENTS

This application is a national stage of International Patent Application No. PCT/EP2019/069483, filed Jul. 19, 2019, which claims priority to Europe Application No. 18195619.4 filed Sep. 20, 2018, the entire contents of which are hereby incorporated by reference herein.

The present invention relates to a metal paste and a method for joining components that uses said metal paste as a sinter bonding material.

The sintering technique embodies a simple method for stably joining components, for example, in the fields of power and consumer electronics. Metal pastes in the form of silver pastes have proved useful as a sinter bonding material and have generally become commonplace in terms of application, although copper pastes have also been described as a usable sinter bonding material.

It is the object of the present invention to provide a copper paste with a balanced spectrum of characteristics that meets customer requirements and is usable as a sinter bonding material.

With the present application, the applicant has successfully provided a copper paste for sintered bond applications that is overall suitable for practical applications.

The invention relates to a metal paste, comprising (A) 65 to 85 wt % (weight %) of metal particles and (B) 10 to 35 wt % of organic solvent, wherein the metal particles (A) consist of 70 to 100 wt % of organically coated copper flakes having a specific surface area in the range of 1.9 to 3.7 m$^2$/g, a total oxygen content in the range of 2 to 4 wt % and a weight ratio of total carbon to total oxygen that is in the range of 0.25 to 0.9.

As component (A), the metal paste according to the invention contains 65 to 85 wt %, preferably 70 to 80 wt %, more preferred 72 to 78 wt % of metal particles.

The metal particles (A) consist of 70 and more wt %, preferably of 80 and more wt %, more preferred of 90 and more wt % and most preferred of 95 and more wt % and particularly of 100 wt % of organically coated copper flakes having a specific surface area in the range of 1.9 to 3.7 m$^2$/g, a total oxygen content in the range of 2 to 4 wt % and a weight ratio of total carbon to total oxygen in the range of 0.25 to 0.9.

Said copper flakes are characterized by a combination of the following features:
  Material: copper or a copper alloy with up to 30 wt % of at least one alloy metal,
  Particle shape: flakes,
  Specific surface area in the range from 1.9 to 3.7 m2/g,
  Organic coating,
  Total oxygen content: in the range of 2 to 4 wt %, preferably 2.5 to 4 wt %,
  Weight ratio of total carbon to total oxygen in the range of 0.25 to 0.9, preferably 0.25 to 0.5.

The term "flakes" as it is used in the description and in the claims denotes particles having the shape of, for example, thin platelets that measure 40 to 200 nm. For the purpose of the invention, flakes have an aspect ratio, for example, in the range of 6:1 to 375:1.

The term "aspect ratio" as used herein refers to the shape of particles and denotes the quotient of the largest and the smallest longitudinal extension of a particle. It can be determined by evaluating microscopic images for the purpose of measuring the dimensions of a statistically meaningful number of, for example, 2,500 to 3,000 individual particles. An optical microscope with a magnification factor of 2,000 to 5,000, for example, and coupled with an automated image analysis system can be used for this purpose.

The specific surface area of the organically coated copper flakes, which is expressed in m$^2$/g, can be determined by means of a BET measurement in accordance with DIN ISO 9277:2014-01 (according to Chapter 6.3.1, statistic-volumetric measurement process, used gas: nitrogen).

The organically coated copper flakes can have a mean particle size (d50), for example, in the range of 1 to 15 µm. The term "mean particle size" denotes the mean particle diameter (d50) that can be determined by means of laser diffraction. Laser diffraction measurements can be performed using a corresponding instrument for measuring particle sizes, such as, for example, a Mastersizer 3000 by Malvern Instruments.

Preferably, the organically coated copper flakes are of a uniform type. But a combination of a plurality of types of such organically coated copper flakes is also possible, wherein, however, each singular type satisfies the aforementioned combination of features that is essential according to the invention.

Said copper flakes are organically coated. The organic coating forms a bonded and, under normal conditions (20° C., atmospheric pressure), non-volatile layer on the surface of the copper flakes. It comprises at least one type of organic coating compounds. In general, the organic coating compounds carry at least one functional group. Possible functional groups are particularly carboxylic acid groups, carboxylate groups, ester groups, keto groups, aldehyde groups, amino groups, amide groups, azo groups, imide groups or nitrite groups. Preferred functional groups are amino groups, aldehyde groups, carboxylic acid groups, carboxylate, and carboxylic acid ester groups. The organic coating compounds with at least one functional group are preferably saturated, monounsaturated, or polyunsaturated organic compounds. Further, the organic coating compounds with at least one functional group can be branched or unbranched. Preferred organic coating compounds are fatty amines, fatty aldehydes, fatty acids, salts of fatty acid or esters of fatty acid, each preferably unbranched and each preferably saturated. According to a preferred embodiment, these are compounds with 8 to 24, more preferred 8 to 18 carbon atoms in the fatty alkyl and/or fatty acyl moieties.

Preferred organic coating compounds are alkyl amines with 8 to 18 carbon atoms, C12-C18-aldehydes, caprylic acid (octanoic acid), capric acid (decanoic acid), lauric acid (dodecanoic acid), myristic acid (tetradecanoic acid), palmitic acid (hexadecanoic acid), margaric acid (heptadecanoic acid), stearic acid (octadecanoic acid), arachidic acid (eicosanoid acid/icosanoic acid), behenic acid (docosanoic acid), lignoceric acid (tetracosaoic acid), as well as any corresponding esters and salts of said acids.

Particularly preferred organic coating compounds are dodecanoic acid, octadecanoic acid, aluminum stearate, copper stearate, sodium stearate, potassium stearate, sodium palmitate and potassium palmitate.

The proportion of the organic coating can be, for example, in the range of 2 to 5 wt % relative to the weight of the organically coated copper flakes.

The coating level, i.e., the ratio of the weight of the organic coating relative to the specific surface area of the organically coated copper flakes, can be, for example, 0.004 to 0.006 g/m$^2$.

The total oxygen content of the organically coated copper flakes is in the range of 2 to 4 wt %, preferably 2.5 to 4 wt %, and the weight ratio of total carbon to total oxygen is in the range of 0.25 to 0.9, preferably in the range of 0.25 to 0.5. The terms total carbon and total oxygen refer to the organically coated copper flakes, i.e., the total carbon is constituted of the carbon contribution from the organic coating as well as a possible carbon contribution that originates from the copper flakes themselves, while the total oxygen is constituted of a possible oxygen contribution from the organic coating as well as an oxygen contribution from the coper flakes themselves (copper oxide).

The preparation of organically coated copper flakes as taught in textbooks is known to the person skilled in the art. Said preparation can be achieved by atomizing liquid (molten) copper and/or liquid (molten) copper alloy into an atmosphere that contains 18 to 21 vol % oxygen, such as, for example, air, followed by subsequent milling of the thus obtained copper(alloy) particles that have oxidized on the particle surface in the presence of the organic coating compound(s). Said milling is particularly cold forming by way of a dry milling process such as, for example, the Hametag process. The process operates inside a mill with the aid of milling tools while organic coating compound(s) are being added. Ball mills are suitable mills for the milling process, preferably those that use steel balls as a milling tool. The copper alloy particles(s) that are deformed into flakes and organically coated during milling can be classified after the milling process; for example, by means of cyclones in the air flow and based on the principles of gravity and centrifugal force.

If the metal particles (A) do not consist of 100 wt % of said copper flakes, it is possible to use at least one type of metal particles that is selected from the group consisting of copper particles of different kinds of copper and of the group consisting of metals other than copper to make up the remainder of the 100 wt % of the metal particles (A).

Examples of copper particles of different kinds of copper are those that differ from said copper flakes at least in terms of one characteristic feature.

Examples of particles from metals other than copper are particularly those made of silver, palladium, gold, and nickel. Particles made of metals other than copper that can be contained in the metal paste according to the invention preferably also have the shape of a flake and are preferably also organically coated.

The present invention relates to metal particles. Said particles can be particles of the pure given metal (having a purity of, for example, at least 99.9 wt %. But they can also be particles of alloys of the given metal with, for example, up to 30 wt % of at least one other alloy metal. Accordingly, said copper flakes can be flakes made of pure copper and/or flakes made of alloys of copper with one or more alloy metals that are selected, for example, from silver, gold, nickel, palladium, platinum, zinc and aluminum.

As component (B), the metal paste according to the invention contains 10 to 35 wt %, preferably 15 to 30 wt %, more preferred 17 to 28 wt % and still more preferred 20 to 25 wt % of organic solvent; i.e., an organic solvent or a mixture of at least two organic solvents.

The one or more organic solvents (B) are the organic solvents that are customarily used for metal pastes. Examples are terpineol, ethylene glycol, dimethylacetamide, 1-tridecanol, 2-tridecanol, 3-tridecanol, 4-tridecanol, 5-tridecanol, 6-tridecanol, isotridecanol, except for a methyl substitution in the second to last C-atom, unsubstituted 1-hydroxy-C16-C20-alkanes, such as 16-methylheptadecan-1-ol, dibasic esters (preferably dimethyl ester of glutaric, adipic or succinic acids or mixtures thereof), glycerin, diethylene glycol, triethylene glycol and aliphatic, particularly, saturated aliphatic hydrocarbons with 5 to 32 carbon atoms, more preferred with 10 to 25 carbons atoms and still more preferred with 16 to 20 carbon atoms. Such aliphatic hydrocarbons are sold by Exxon Mobil, for example, under the brand name Exxsol™ D140 or under the brand name Isopar M™.

As component (C), the metal paste according to the invention can contain 0 to 15 wt % of at least one additive. Examples of additives (C) comprise metal precursors, sintering aids, dispersing agents, surfactants, defoaming agents, binding agents, polymers such as cellulose derivatives such as, for example, methyl cellulose, ethyl cellulose, ethyl methyl cellulose, carboxy cellulose, hydroxypropyl cellulose, hydroxyethyl cellulose, hydroxymethyl cellulose and viscosity-controlling agents.

The total of the wt % from components (A) and (B) or, if a component of type (C) is contained therein, of components (A) to (C) is 100 wt % relative to the metal paste according to the invention; i.e., prior to its application. Correspondingly, the metal paste according to the invention can be prepared by mixing the components (A) and (B) or (A) to (C).

By its very nature, the metal paste according to the invention has a price advantage over a silver paste. The sintered bonds that can be produced using the metal paste according to the invention meet customer requirements. The use of the metal paste according to the invention is particularly advantageous in the production of sintered bonds between components, more specifically, between contact surfaces of components, wherein at least one of the contact surfaces that are to be joined by sinter bonding has a contact surface made of copper or metallized copper. No thermomechanical stresses at all or, if any, only minimal stresses have been observed therein between contact surface(s) and sintered bond and/or the contact surfaces of the components. No corrosion has been observed on the copper contact surfaces; and if there is any corrosion, it is only minimal.

The metal paste according to the invention can be used particularly as a sinter bonding material, more specifically as a sinter paste, i.e., in a sintering process. Sintering is understood as the joining of two or more components by means of heating while avoiding that the metal particles (A) enter their liquid phase.

The sintering process that is performed using the metal paste according to the invention can be executed while applying pressure, or without pressure.

The joining of at least two components is understood to mean attaching a first component on a second component. In this context, "on" only means that a surface of the first component is bonded with a surface of the second component, wherein the relative positioning of each of the two components or of the arrangement that contains at least two components is immaterial.

In the context of the invention, the term "component" is preferably intended to comprise individual parts. Preferably, said individual parts cannot be further disassembled.

The term "component" as used herein denotes particularly components that are used in electronics; in short: electronic components. These comprise, for example, diodes, LEDs (light emitting diodes), dies, IGBTs (insulated-gate bipolar transistors), MOSFETs (metal oxide semiconductor field effect transistors), ICs (integrated circuits), sensors, cooling elements, resistors, capacitors, coils, joining elements (e.g., clips), base plates, antennae, lead frames, PCBs (printed circuit boards), flexible electronics, ceramic substrates, metal ceramic substrates such as, for example, DCB substrates (direct copper bonded substrate), IMS (insulated metal substrate), and the like.

The components that are to be joined herein can be components of the same type or of different types.

Insofar as they do not consist of metal anyway, the one or more components can comprise at least one metal contact surface such as, for example, in form of a metallization layer by means of which a sandwich arrangement is obtained. Said metallization layer is preferably part of the one or more components. The metallization layer is preferably located at least on one surface of the one or more components.

The bonding of the components is preferably achieved by means of the metal paste according to the invention via said metal contact surface(s) or metallization layer(s).

The metallization layer can include pure metal or a metal alloy. It can be preferred for the metallization layer to include at least 50 wt %, more preferably at least 70 wt %, still more preferred at least 90 wt % or, alternatively, 100 wt % of pure metal. The pure metal is selected, for example, from the group that consists of copper silver, gold, palladium, and platinum.

The invention also relates to a method for joining at least two components by means of sintering.

To this end, first, the two or more components are brought into contact with each other. In doing so, the contacting is achieved by means of the metal paste according to the invention. An arrangement is provided for this purpose, wherein the metal paste according to the invention is located between each two of the at least two components, more precisely, between the metal contact surfaces or metallization layers thereof.

Accordingly, if two components, i.e., component 1 and component 2, are to be joined, the metal paste according to the invention is located between said component 1 and component 2 prior to sintering. On the other hand, it is conceivable for more than two components to be joined together. For example, it is possible to join component 1, component 2 and component 3 together in such a manner that component 2 is located between component 1 and component 3. In this case, the metal paste according to the invention is located both between said component 1 and component 2, and between component 2 and component 3.

The individual components are present as a sandwich arrangement and are joined together. A sandwich arrangement is understood to mean an arrangement wherein two components are arranged as stacked one on top of the other and substantially in parallel relative to each other.

The arrangement of at least two components and metal paste according to the invention, wherein the metal paste is located between two components of said arrangement, can be produced according to a known method from the prior art.

Preferably, the metal paste according to the invention is initially applied to at least one contact surface of a component 1. Subsequently, another component 2 is placed by its contact surface or by one of its contact surfaces onto the metal paste that has been applied to the contact surface of component 1.

The application of the metal paste according to the invention onto the contact surface of a component can be achieved by conventional processes such as, for example, by means of a printing process, such as screen printing or stencil printing. In contrast, the application of the metal paste according to the invention can also be achieved by means of a dispersion technique, pin transfer, or dipping.

After the metal paste according to the invention has been applied, preferably, the contact surface of said component that has received said metal paste is brought into contact with a contact surface of the component that is to be joined thereto by means of the metal paste. Correspondingly, a layer of the metal paste according to the invention is located between the components that are to be joined.

The wet film thickness of the metal paste according to the invention between the components that are to be joined is preferably in the range of 20 to 150 μm. Wet film thickness is understood herein as the distance between the opposing contact surfaces of components that are to be joined prior to any possible drying and prior to sinter bonding. The preferred wet film thickness depends on the selected method for applying the metal paste. If, for example, the metal paste is applied by means of a screen-printing process, preferably, the wet film thickness can be between 20 and 50 μm. If the metal paste is applied by means of stencil printing, the preferred wet film thickness can be in the range of 20 to 150 μm. If the dispensing technique is used, the preferred wet film thickness can be in the range of 20 to 150 μm.

An optional drying step is performed prior to sintering, i.e., the organic solvent is removed from the applied metal paste. According to a preferred embodiment, the proportion of the organic solvent in the metal paste after drying is, for example, 0 to 5 wt % relative to the original proportion of organic solvent in the metal paste according to the invention, i.e., metal paste that is ready to be applied. In other words, according to this preferred embodiment, for example, 95 to 100 wt % of the solvent originally contained in the metal paste according to the invention is removed during drying.

If a drying process is carried out, in the case of pressureless sintering, said drying can occur after the production of the arrangement, which is after the contacting of the components that are to be joined. In the case of sintering under pressure, drying can occur even after applying the metal paste onto the at least one surface of the component and prior to establishing contact with the component that is to be joined.

The drying temperature is preferably in the range of 80 to 150° C. The usual drying times are in the range of 5 to 45 minutes.

The arrangement of the at least two components and the metal paste, which is located and dried between said components, is finally subjected to the actual sintering process.

Actual sintering occurs at a temperature in the range of, for example, >250 to 350° C., preferably >280 to 350° C., particularly 290 to 350° C., either as a pressureless process or sinter bonding under pressure.

For sinter bonding under pressure, the applied pressure is, for example, in the range of 1 to 30 MPa, and preferably in the range of 5 to 25 MPa, especially 10 to 15 MPa.

The sinter period is, for example, in the range of 1 to 90 minutes; for sinter bonding under pressure, for example, in the range of 1 to 10 minutes; for pressureless sinter bonding, for example, in the range of 30 to 90 minutes.

The sinter process occurs in an oxygen-free atmosphere. An oxygen-free atmosphere within the meaning of the present invention is understood to mean an atmosphere with an oxygen content that is not more than 50 ppm, preferably not more than 10 ppm.

The atmosphere therein can be a reducing atmosphere (for example, argon or nitrogen with an admixture of, for example, hydrogen or formic acid). However, the use of a reducing atmosphere is not necessary; rather, working in an inert gas atmosphere (for example, nitrogen, argon, carbon dioxide) is useful and possible.

The sintering is executed in a customary apparatus that is suitable for sinter bonding and allows for adjusting the previously described process parameters.

EXAMPLES

1. Preparation of the Copper Pastes:

Each of the pastes P1-P4 (comparative pastes) and P5-P9 (each according to the invention) with comparable processing viscosity were prepared initially by mixing organically coated copper flakes with α-terpineol.

| Comparison pastes | P1 | P2 | P3 | P4 |
|---|---|---|---|---|
| Organically coated copper flakes [wt %] | 73 | 75 | 67 | 83 |
| α-terpineol [wt %] | 27 | 25 | 33 | 17 |
| Organic coating | Stearic acid | Stearic acid | Stearic acid | Stearic acid |
| Specific surface of the organically coated copper flakes [m$^2$/g] | 1.88 | 3.31 | 1.24 | 1.01 |
| Total oxygen content of organically coated copper flakes [wt %] | 2.8626 | 4.9282 | 4.04 | 0.45 |
| Weight ratio of total carbon to total oxygen in organically coated copper flakes | 0.15 | 0.22 | 0.13 | 1.52 |

| Pastes according to the invention | P5 | P6 | P7 | P8 | P9 |
|---|---|---|---|---|---|
| Organically coated copper flakes [wt %] | 75 | 75 | 75 | 75 | 75 |
| α-terpineol [wt %] | 25 | 25 | 25 | 25 | 25 |
| Organic coating | Stearic acid | Stearic acid | Stearic acid | Stearic acid | Stearic acid |
| Specific surface of the organically coated copper flakes [m$^2$/g] | 3.31 | 2.04 | 2.31 | 3.70 | 1.95 |
| Total oxygen content of organically coated copper flakes [wt %] | 3.07 | 2.72 | 3.25 | 3.82 | 2.83 |
| Weight ratio of total carbon to total oxygen in organically coated copper flakes | 0.37 | 0.44 | 0.33 | 0.39 | 0.36 |

2. Application and Sinter Bonding of Copper Pastes:

Using stencil printing, each copper paste was applied to a DCB substrate with a wet film thickness of 100 μm and an area of 4 mm·4 mm full area. Drying occurred subsequently inside the convection oven at 80° C. for a duration of 30 minutes, thus removing α-terpineol. Silicon chips were placed onto the dried pastes by their contact surfaces of 4 mm·4 mm, at a temperature of 25° C. The silicon chips were heated at 15 MPa and 300° C. for 3 minutes in a nitrogen atmosphere for sinter bonding the components with the DCB.

After sintering, the adhesion was determined based on the shear strength. In doing so, the silicon chips therein were sheared using a shear chisel at a speed of 0.3 mm/s at room temperature. The force was recorded using a load cell (instrument Nordson DAGE 4000Plus by the company Nordson DAGE, Germany).

The following table shows the obtained measured results:

| Paste | Shear test [N/mm$^2$] *Target shear strength: ≥20 N/mm$^2$ |
|---|---|
| P1 | 5.50 |
| P2 | 8.76 |
| P3 | 0.59 |
| P4 | 13.13 |
| P5 | 46.10 |
| P6 | 49.90 |
| P7 | 25.89 |
| P8 | 51.01 |
| P9 | 41.20 |

The invention claimed is:

1. A metal paste, comprising (A) 65 to 85 wt % of metal particles and (B) 10 to 35 wt % of organic solvent, wherein the metal particles (A) consist of 70 to 100 wt % of organically coated copper flakes having
    a specific surface area in the range of 1.9 to 3.7 m$^2$/g,
    a total oxygen content in the range of 2 to 4 wt %, and
    a weight ratio of total carbon to total oxygen in the range of 0.25 to 0.9.

2. The metal paste according to claim 1, wherein the organically coated copper flakes are thin plates measuring 40 to 200 nm having an aspect ratio in the range of 6:1 to 375:1.

3. The metal paste according to claim 1, wherein the organically coated copper flakes have a mean particle size (d50) in the range of 1 to 15 μm.

4. The metal paste according to claim 1, wherein the organic coating forms a bonded and non-volatile layer on the surface of the copper flake at 20° C. and atmospheric pressure.

5. The metal paste according to claim 1, wherein the organic coating comprises at least one type of organic coating compounds.

6. The metal paste according to claim 1, wherein the organic coating is 2 to 5 wt % of the organically coated copper flakes.

7. The metal paste according to claim 1, wherein the organically coated copper flakes have a coating level of 0.004 to 0.006 g/m$^2$.

8. The metal paste according to claim 1, wherein the organically coated copper flakes are made of flakes made of copper alloys having up to 30 wt % of at least one alloy metal.

9. The metal paste according to claim 8, wherein the at least one alloy metal is selected from the group consisting of silver, gold, nickel, palladium, platinum, zinc, and aluminum.

10. The metal paste according to claim 1, further comprising up to 15 wt % of at least one additive (C) selected from the group consisting of metal precursors, sintering aids, dispersing agents, surfactants, defoaming agents, binding agents, polymers, and viscosity-controlling agents.

11. A method for joining components, the method comprising:
    preparing a sandwich arrangement that includes at least one component 1, one component 2 and one metal paste according to claim 1, the metal paste located between contact surfaces of component 1 and component 2; and
    bonding the contact surfaces of component 1 and component 2 by sintering the metal paste.

12. The method according to claim 11, wherein at least one of the contact surfaces that are to be bonded by sintering is a contact surface made of copper or of a metallized copper.

13. The method according to claim 11, wherein sinter bonding occurs while applying pressure, or pressureless.

14. The method according to claim 11, wherein the one component 1 and the one component 2 are parts that are used in electronics.

15. The method according to claim 11, wherein the sinter bonding occurs within a temperature range of 250 to 350° C.

16. The method according to claim 1, wherein the total oxygen content is in the range of 2.5 to 4 wt %.

17. The metal paste according to claim 1, wherein the organically coated copper flakes are made of pure copper flakes.

18. The metal paste according to claim 1, wherein the organically coated copper flakes are made of pure copper flakes and flakes made of copper alloys having up to 30 wt % of at least one alloy metal.

19. The metal paste according to claim 1, wherein the metal paste comprises 70 to 80 wt % of the metal particles and 15 to 30 wt % of the organic solvent.

20. The metal paste according to claim 1, wherein the metal paste comprises 72 to 78 wt % of the metal particles and 17 to 28 wt % of the organic solvent.

\* \* \* \* \*